United States Patent

Nakatani et al.

Patent Number: 5,305,339
Date of Patent: Apr. 19, 1994

[54] PULSE LASER APPARATUS

[75] Inventors: Hajime Nakatani; Atsushi Sugitatsu; Yasushi Minamitani, all of Amagasaki, Japan

[73] Assignee: Mitsubishi Denki Kabushiki Kaisha, Tokyo, Japan

[21] Appl. No.: 793,430

[22] PCT Filed: Feb. 8, 1991

[86] PCT No.: PCT/JP91/00152

§ 371 Date: Dec. 17, 1991

§ 102(e) Date: Dec. 17, 1991

[51] Int. Cl.$^5$ .................................................. H01S 3/00
[52] U.S. Cl. ........................................ 372/38; 372/86; 372/83
[58] Field of Search .............................. 372/38, 86, 83

[56] References Cited

U.S. PATENT DOCUMENTS

| 4,612,643 | 9/1986 | Long et al. | 372/86 |
| 4,630,277 | 12/1986 | Cirkel et al. | 372/86 |
| 4,837,773 | 6/1989 | Wakata | 372/86 |
| 5,042,047 | 8/1991 | Ono et al. | 372/86 |
| 5,090,021 | 2/1992 | Nakatani et al. | 372/86 |

OTHER PUBLICATIONS

Magnetic Pulse Compression For Excimer Lasers; Technical Note No. 2, May 1983; published by Questek Inc.

Primary Examiner—Leon Scott, Jr.
Attorney, Agent, or Firm—Oblon, Spivak, McClelland, Maier & Neustadt

[57] ABSTRACT

By dissipating a reverse voltage energy occurring on the pulse generation capacitor (4) of a pulse laser apparatus through the diode (11) connected in parallel with this pulse generation capacitor (4), arc or streamer becomes not occurring, and hence the lifetime of the main discharge electrodes become long and a high-repetition rate oscillation becomes possible.

4 Claims, 4 Drawing Sheets

PULSE LASER APPARATUS

TECHNICAL FIELD

The present invention relates to a pulse laser apparatus.

BACKGROUND ART

FIG. 1 is an excitation circuit of a conventional excimer laser shown in, for example, page 5 of Denki Gakkai (Institute of Electrical Engineers) Technical Report (Part II) ("State of the art of short wavelength laser"). In this figure, numerals (1) and (2) are a pair of main discharge electrodes which are facing to each other; numeral (3) is a peaking capacitor attached in parallel with the main discharge electrodes (1) and (2); numeral (4) is a pulse generation capacitor, and one electrode thereof is connected to the main discharge electrode (1). Numeral (5) is a switch connected across the other end of the pulse generation capacitor (4) and the main discharge electrode (2); and in this prior art, it is comprised of a thyratron. Numeral (6) is a charging reactor, and numeral (7) is a charging terminal.

Next, the operation is elucidated. A positive high voltage is applied to the charging terminal (7), and the pulse generation capacitor (4) is charged up through the charging reactor (6). Graphs which illustrate temporal variations of voltages appearing on both ends of the pulse generation capacitor (4) and of the peaking capacitor (3), after closing the switch (5) at $t=t_0$, are shown in FIG. 2. Electric charge stored in the pulse generation capacitor (4) during a period of $t_0 \leq t \leq t_1$ is transferred to the peaking capacitor (3), and at $t=t_1$ a discharge starts between the main electrodes (1) and (2). In excimer lasers, although a preionization discharge prior to the main discharge is required, electrodes and its associating circuit for this are omitted in the elucidation in FIG. 1 and other figures for the present patent. During a period of $t_1 \leq t \leq t_2$, energy is injected into a main discharge taking place across the main discharge electrodes (1) and (2) from the peaking capacitor (3), thereby the laser oscillates. In a laser such as an excimer laser in which its discharging resistance is small (for example, 0.2 Ω), voltage appearing across both ends of the peaking capacitor (3) becomes an oscillatory waveform, and hence a reverse polarity voltage appears (FIG. 2, $t=t_2$). At a time point when the oscillation almost terminates, a voltage (denoted by Vr in FIG. 2(a)) which is reverse in polarity with respect to that at a time of charging up appears across both ends of the pulse generation capacitor (4).

Another example of the conventional pulse laser excitation circuit is shown in FIG. 3. In this example, electric charge of a pulse generation capacitor (4) is transferred to a peaking capacitor (3) through a saturable reactor (8). This is a circuit referred to as an MPC circuit, in which, in order to reduce the loss in a thyratron switch (5), another pulse generation capacitor (9) and a current suppression reactor (10) are provided. The working waveform of this circuit is shown in FIG. 4, wherein similarly as in the conventional example previously described, after the discharge started across main electrodes (1) and (2) at $t=t_1$, the current oscillates, and finally a voltage Vr which is reverse in the polarity with respect to that at the beginning appears across both ends of the pulse generation capacitor (4).

Since the conventional pulse laser excitation circuit is constituted as has been described above, a reverse polarity voltage appears across the both ends of the pulse generation capacitor; and this energy ($=\frac{1}{2}cVr^2$) is dissipated as an arc or a streamer at the main discharge electrodes considerably later (for example, an order of 1 μs later) after the main discharge appeared. This is a so-called after-current, which brings about a problem that it does not contribute to the laser generation, but damages the main discharge electrodes and shortens the lifetime of the electrodes. And, there is such a problem that, owing to a flow of after-currents, a high-repetition rate oscillation becomes impossible.

SUMMARY OF THE PRESENT INVENTION

The present invention has been done to solve the problems such as described above, and purposes to obtain a pulse laser excitation circuit which is capable of elongating the lifetime of the electrodes as well as performing a high-repetition rate oscillation.

A pulse laser excitation circuit in accordance with the present invention is such that a diode is disposed in a manner that it is in parallel with a pulse generation capacitor and conducts current in a direction which is reverse with respect to an applied voltage, and this diode makes a conduction of a reverse polarity voltage appearing on the pulse generation capacitor, thereby preventing an impression of a reverse polarity voltage on the pulse generation capacitor.

BEST MODE FOR CARRYING OUT THE INVENTION

Figure 5:
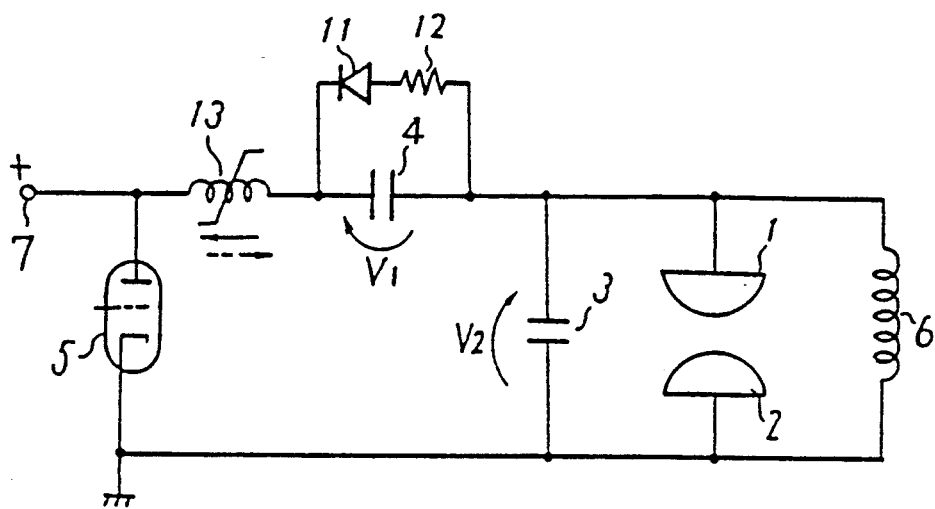
FIG. 5 is a configuration drawing of a pulse laser apparatus showing one embodiment of the preset invention.

In the following, one embodiment of the present invention is elucidated referring to the drawings. In FIG. 5, numeral (11) is a diode; numeral (12) is a resistor; and a series-connected matter of the diode (11) and the resistor (12) is connected in parallel with a pulse generation capacitor (4). And the polarity of connection of the diode (11) is such that it is connected in a direction of a non-conducting state with respect to the charging polarity from the charging terminal (7). Numeral (13) is a switch composed of a saturable reactor connected between a pulse generation capacitor (4) and a switch (5) consisting of a thyratron. In this case, in parallel with the main discharge electrodes (1) and (2), a series-connected matter of the pulse generation capacitor (4) and the switch is connected thereto, and this switch consists of a series-connected matter of the thyratron (5) and the saturable reactor (13).

Figure 1:
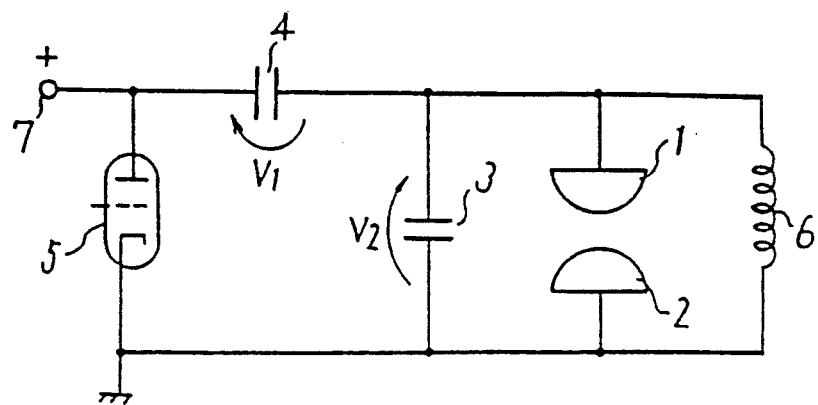
FIG. 1 is a configuration drawing of a conventional pulse laser apparatus.
Figure 2:
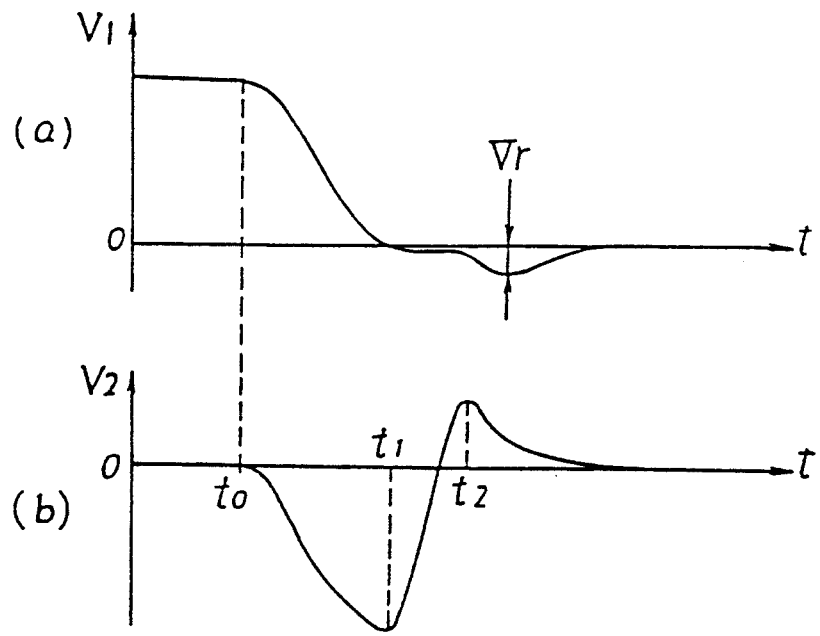
FIG. 2 is a voltage waveform curve showing the action of FIG. 1.
Figure 6:
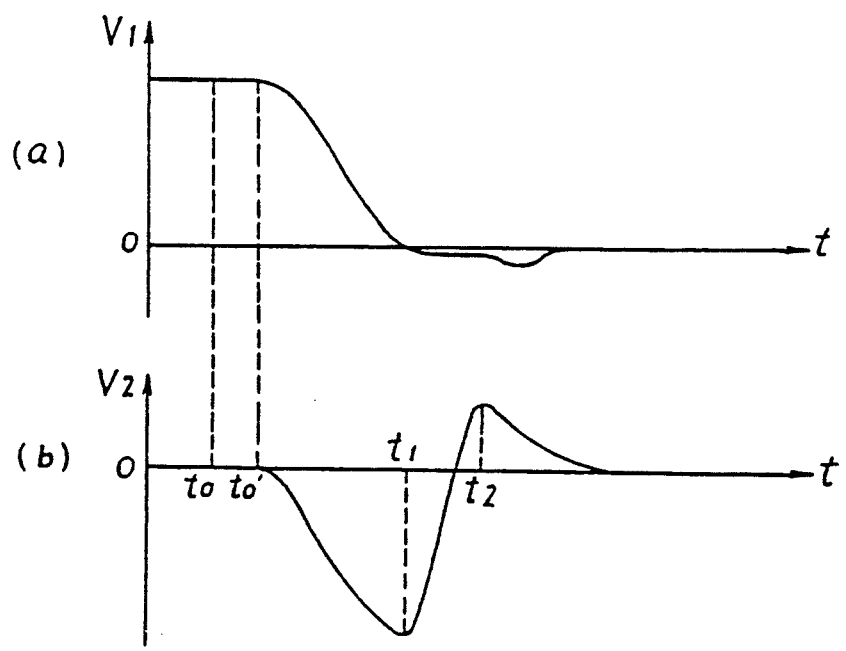
FIG. 6 is a voltage waveform curve showing the action of FIG. 5.

Upon impression of a trigger to the thyratron switch (5) at $t=t_0$, after a time lapse determined by a product of voltage × time of the saturable reactor (13) (FIG. 6, $t = t_0'$), electric charge begins to be transferred from the pulse generation capacitor (4) to the peaking capacitor (3). Voltage waveform is shown in FIG. 2. At $t=t_1$, a main discharge starts between the main discharge electrodes (1) and (2), and at $t=t_2$, voltage of the peaking capacitor (3) reverses its polarity. Although a reverse voltage is going to occur on the pulse generation capacitor (4) after $t=t_2$, any reverse voltage does not appear on the pulse generation capacitor (4) since the diode (11) and the resistor (12) are connected in parallel to the pulse generation capacitor (4), and an excess energy produced as a result of oscillation after the discharge is dissipated by the resistor (12). As a result, since an aftercurrent flowing between the main discharge electrodes (1) and (2) disappears, and thus arc or streamer does not occur. In this embodiment, by connecting the saturable reactor (13), a merit that the response speed required for the diode (11) can be relaxed to a slow one. This is owing to the following reason. Since the saturable reactor (13) of FIG. 5 is being saturated in a direction of a solid line arrow shown in the figure, once a reverse electric charge is stored in the pulse generation capacitor (4), this saturable reactor (13) falls in the blocked state and hence stops its successive oscillatory electric charge movement. Since it is possible to let the diode (11) flow the reverse electric charge slowly through the resistor (12) for a relatively long time interval (for example, 200 ns) during which the saturable reactor keeps this blockade, the response speed of the diode (11) is allowed to be slow, and the peak current can be made small. Therefore, even a low-cost diode can be used.

Figure 7:
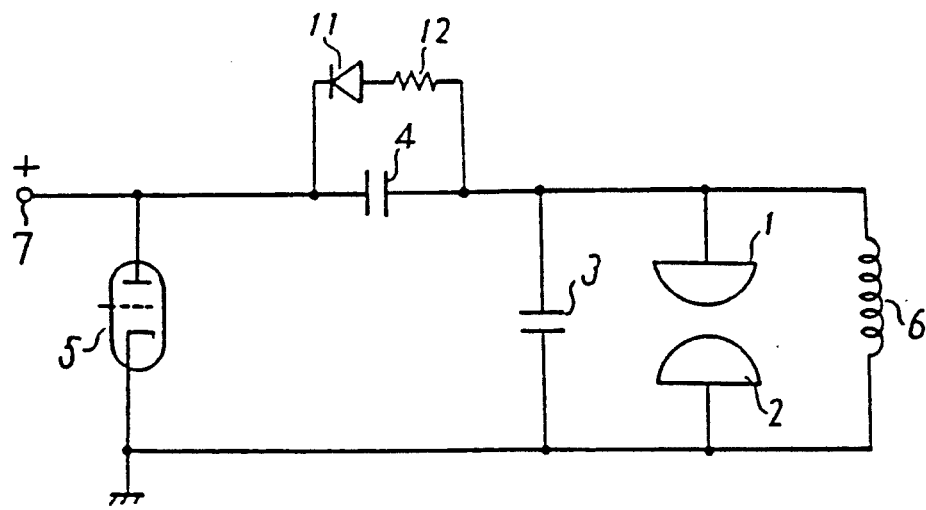
FIG. 7 through FIG. 9 are constitutional drawing showing other embodiments of the present invention.

Different from FIG. 5, an embodiment of a case that a high-speed and large-current diode is used is shown in FIG. 7. In this case, even without using a saturable reactor, the same effect as in the embodiment described above can be obtained.

Figure 3:
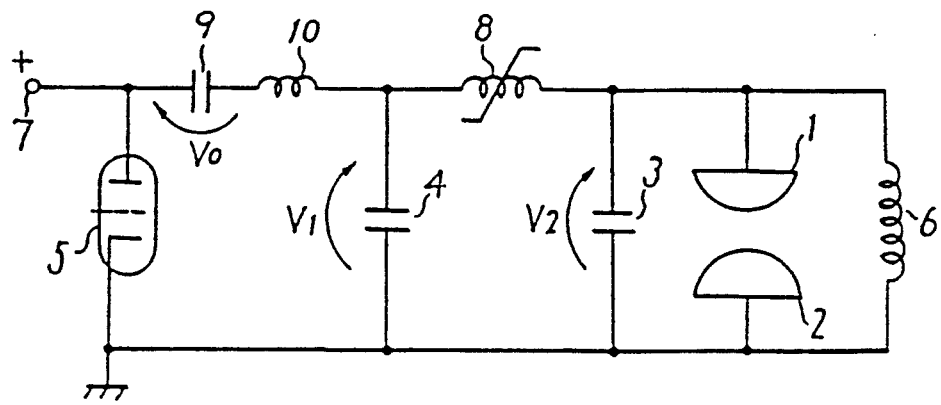
FIG. 3 is a configuration drawing of another conventional pulse laser apparatus.
Figure 4:
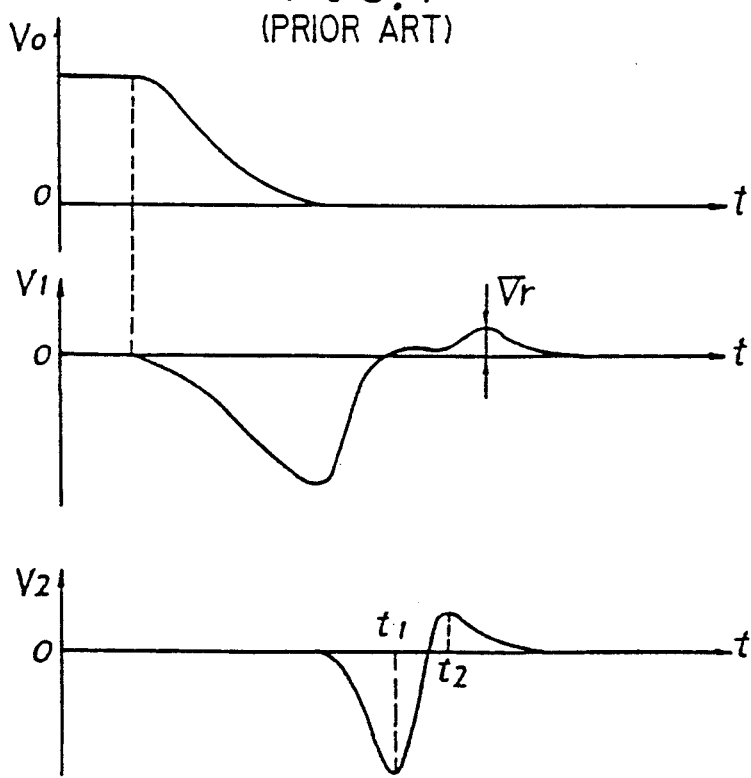
FIG. 4 is a voltage waveform curve showing the action of FIG. 3.
Figure 8:
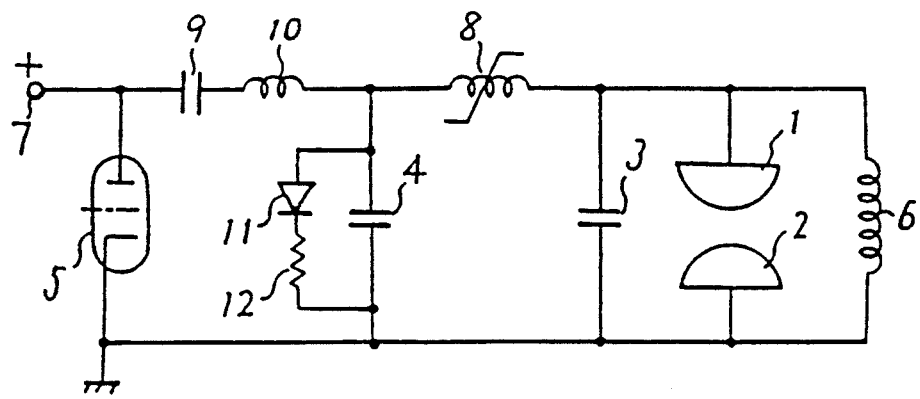

An embodiment of the present invention which is corresponding to the conventional example shown in FIG. 3 is shown in FIG. 8. A series-connected matter of a switch consisting of a saturable reactor (8) and pulse generation capacitor (4) are connected in parallel between the main electrodes (1) and (2), and a series-connected matter of a diode (11) and a resistor (12) is connected in parallel with this pulse generation capacitor (4). Electric charge which is charged up in another pulse generation capacitor (9) is capacitance-transferred to the pulse generation capacitor (4) by a thyratron switch (5), and for the polarity of this voltage which is initially charged up in the pulse generation capacitor (4), the diode (11) is connected in the polarity that it becomes non-conducting state. In this case also, the same effect as in the embodiment described above is exhibited.

Figure 9:
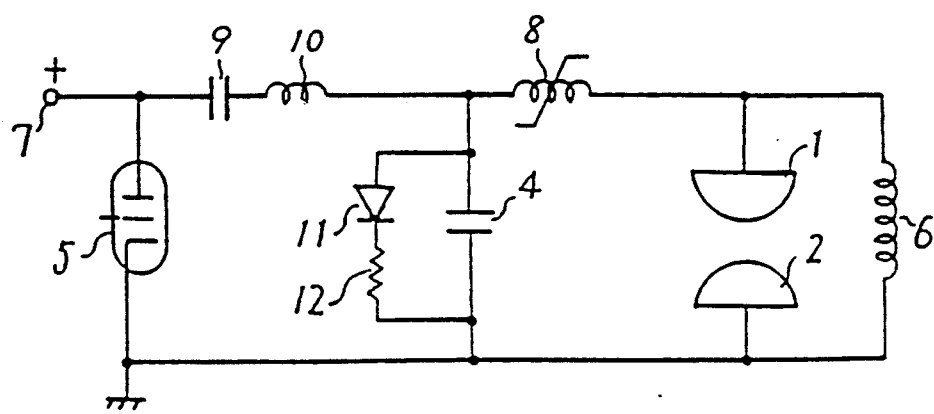

Hereupon, in the embodiment described above, although a case of using a peaking capacitor (3) has been shown, even a case of not using the peaking capacitor (3) (for example, an embodiment shown in FIG. 9) can exhibit the same effects as in the embodiment described above.

And, although the case that the series-connected matter of the diode (11) and the resistor (12) were connected in parallel with the pulse generation capacitor (4) has been shown in the above-mentioned embodiment, in a case where the internal resistance of the diode (11) is large, the same effect as in the above-mentioned embodiment can be exhibited even when the resistor (12) is omitted.

And, in the above-mentioned embodiment, although a thyratron was shown as the switch (5), it is also possible to use a series-connected matter of semiconductor switch (thyristor, SIT transistor, FET, IGBT or the likes), or switches such as a spark gap or a rail switch can also be used. And, although it has been explained that the charging was done in the positive polarity from the charging terminal (7), the negative polarity can also be used. In either way, the same effect as in the above-mentioned embodiment can be exhibited.

Hereupon, although, as for a laser, explanation was given on an excimer laser in the above-mentioned embodiment, the embodiment can be applicable for any pulse laser as far as its discharge resistance is small and the discharge current is oscillatory, the same effect as in the above-mentioned embodiment can be exhibited.

Besides, in place of the capacitor in the above-mentioned embodiment, use of a pulse forming circuit, which is a distributed constant circuit, can exhibit the same effect.

Moreover, in the above-mentioned embodiment, even with other charging circuit element such as a low-resistance resistor for the charging reactor (6), the same effect can be expected.

As has been described above, according to the present invention, by dissipating a reverse voltage energy occurring on the pulse generation capacitor through the diode connected in parallel to this pulse generation capacitor, arc or streamer does not occur, and hence there is such an effect that a pulse laser is obtainable in which the lifetime of the main discharge electrodes becomes long and a high-repetition rate oscillation becomes possible.

We claim:

1. A pulse laser apparatus comprising:
    a pair of main discharge electrodes opposed to one another;
    a peaking capacitor connected in parallel with the pair of main discharge electrodes;
    a pulse generation capacitor connected in series with the pair of main discharge electrodes;
    a charging terminal connected in series with the pulse generation capacitor for charging an electric charge on the pulse generation capacitor with a predetermined charging polarity, wherein a main discharge is produced between said pair of main discharge electrodes by transferring the electric charge on the pulse generation capacitor onto the peaking capacitor; and
    a diode in series with a resistor, both being connected in parallel across the pulse generation capacitor in a direction of non-conduction with respect to the predetermined charging polarity, thereby preventing a reverse polarity voltage from appearing on the pulse generation capacitor.

2. The pulse laser apparatus according to claim 1, further comprising a saturable reactor connected in series with the pulse generation capacitor.

3. A pulse laser apparatus comprising:
    a pair of main discharge electrodes opposed to one another;
    a first pulse generation capacitor connected in series with the pair of main discharge electrodes;
    a second pulse generation capacitor connected in parallel with the pair of main discharge electrodes;
    a charging terminal connected in series with the first pulse generation capacitor for charging an electric charge on the first pulse generation capacitor, wherein a main discharge is produced between said pair of main discharge electrodes by transferring the electric charge on the first pulse generation capacitor onto the second pulse generation capacitor; and a diode in series with a resistor, both being connected in parallel across the second pulse generation capacitor in a direction of non-conduction with respect to a direction of voltage that the second pulse generation capacitor is to be initially charge, thereby preventing a reverse polarity voltage from appearing on the second pulse generation capacitor.

4. The pulse laser apparatus according to claim 3, further comprising a saturable reactor connected between the first and second pulse generation capacitors and the pair of main discharge electrodes.

* * * * *

UNITED STATES PATENT AND TRADEMARK OFFICE
CERTIFICATE OF CORRECTION

PATENT NO.  : 5,305,339
DATED       : April 19, 1994
INVENTOR(S) : Hajime Nakatani et al.

It is certified that error appears in the above-indentified patent and that said Letters Patent is hereby corrected as shown below:

On the title page, Item [87],

The PCT WO number and the Publication date has been omitted, should read: --WO 92/14288

Aug. 20, 1992--

Signed and Sealed this

Twentieth Day of September, 1994

Attest:

BRUCE LEHMAN

*Attesting Officer*    *Commissioner of Patents and Trademarks*